US009380687B2

(12) United States Patent
Asakura et al.

(10) Patent No.: US 9,380,687 B2
(45) Date of Patent: Jun. 28, 2016

(54) ESD PROTECTION DEVICE

(75) Inventors: Kensaku Asakura, Tokyo (JP); Shingo Suzuki, Tokyo (JP); Takahiro Fujimori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 78 days.

(21) Appl. No.: 14/364,825

(22) PCT Filed: Sep. 13, 2012

(86) PCT No.: PCT/JP2012/073407
§ 371 (c)(1),
(2), (4) Date: Jun. 12, 2014

(87) PCT Pub. No.: WO2013/088801
PCT Pub. Date: Jun. 20, 2013

(65) Prior Publication Data

US 2014/0347779 A1 Nov. 27, 2014

(30) Foreign Application Priority Data

Dec. 12, 2011 (JP) ................................ 2011-271300
Aug. 31, 2012 (JP) ................................ 2012-191577

(51) Int. Cl.
*H02H 9/04* (2006.01)
*H02H 3/02* (2006.01)
*H05F 3/04* (2006.01)
*H01T 4/12* (2006.01)

(52) U.S. Cl.
CPC ... *H05F 3/04* (2013.01); *H01T 4/12* (2013.01)

(58) Field of Classification Search
CPC ................................ H02H 9/04; H02H 9/046
USPC ........................................................... 361/56
See application file for complete search history.

(56) References Cited

U.S. PATENT DOCUMENTS 8,934,205 B2 * 1/2015 Asakura .................. H01C 7/12
361/56
2009/0067113 A1 3/2009 Urakawa (Continued)

FOREIGN PATENT DOCUMENTS

EP 2 352 211 A1 8/2011
JP A-2008-244348 10/2008

(Continued)

OTHER PUBLICATIONS

Ikeda; WO-2011-096335; Fig. 1-5; Abstract, Entired specification, Drawings.*

(Continued)

*Primary Examiner* — Dharti Patel
(74) *Attorney, Agent, or Firm* — Oliff PLC

(57) ABSTRACT

An ESD protection device is provided which has a low electrostatic capacitance, a low short-circuiting rate and an excellent durability. Also, in the ESD protection device, the damage derived from short-circuiting or the peak voltage can be inhibited. The ESD protection device includes an insulating substrate, electrodes separately and oppositely disposed on the insulating substrate and a discharge inducing section arranged between the electrodes. The discharge inducing section consists of porous structure with microscopic voids discontinuously dispersed therein and has a hollow structure in which at least one hollow space is contained. Further, the plane where the hollow structure is formed has a dense structure.

8 Claims, 6 Drawing Sheets

(56) References Cited

U.S. PATENT DOCUMENTS

| | | | |
|---|---|---|---|
| 2011/0304946 | A1 | 12/2011 | Koga et al. |
| 2013/0201585 | A1 | 8/2013 | Ikeda et al. |

FOREIGN PATENT DOCUMENTS

| | | | |
|---|---|---|---|
| JP | B2-4247581 | | 4/2009 |
| WO | WO 2010/061519 | A1 | 6/2010 |
| WO | WO 2010/061550 | A1 | 6/2010 |
| WO | 2010/122732 | A1 | 10/2010 |
| WO | 2011/096335 | A1 | 8/2011 |

OTHER PUBLICATIONS

Written Opinion of the International Searching Authority issued in International Application No. PCT/JP2012/073407 on Oct. 16, 2012 (with translation).

International Preliminary Report on Patentability issued in International Application No. PCT/JP2012/073407 on Jun. 17, 2014 (with translation).

Jul. 20, 2015 Extended Search Report issued in European Patent Application No. 12858188.1.

* cited by examiner

ESD PROTECTION DEVICE

The present invention relates to an ElectroStatic Discharge (ESD) protection device, especially an ESD protection device useful in the application of a high-speed transmission system or the integration with common mode filters.

BACKGROUND

Recently, the downsizing and performance improvement of the electric devices are under rapid development. Also, the improvement of the frequency on the transmission speed and the lowering of driving voltage are remarkable, as seen in the high-speed transmission systems such as USB 2.0, S-ATA2, HDMI or the like. On the contrary, with the downsizing or the lowering of driving voltage of the electric devices, the breakdown voltage of the electric components which are used in the electric devices is decreased. In this respect, the protection of the electric components from overvoltage becomes an important technical subject, for example, protecting the electric components against the electrostatic pulses derived from the contact between the human body and the terminal of an electric device.

In the past, in order to protect electric components from such electric pulse, a method of providing a varistor between the ground and a line to be subjected to static electricity has generally been used. As the signal frequency of the signal line is being rapidly increased in recent years, the signal quality deteriorates when the electrostatic capacitance of the ESD protection device is large. Thus, when the transmission speed is up to several hundreds of Mbps or more, a protection device with a low electrostatic capacitance (1 pF or less) is needed. In addition, an ESD protection device with a large electrostatic capacitance cannot be used in an antenna circuit and an RF module.

It has been suggested that an ESD protection device with a discharge inducing section filled between two separately and oppositely arranged electrodes can be used as an ESD device with a low electrostatic capacitance. This device is arranged between the ground and a line to be subjected to static electricity in the same way of a laminated varistor. If a much too high voltage is applied, discharge will happen between the oppositely arranged electrodes of the ESD protection device and then the static electricity will be led to the ground side. Such ESD protection device of gap type possesses properties such as a high insulation resistance, a low electrostatic capacitance and a good responsiveness.

In another respect, as an important property of the ESD protection device, the property of electrostatic adsorption is also presented as a subject of the present invention. If the discharging process occurs under a low voltage, it is necessary to restrain the peak voltage during the discharging process. If the peak voltage cannot be suppressed to a certain level, a device becoming the protection object may be destroyed. In this respect, it is necessary to restrain the peak voltage to a low level. Further, the durability issue related to repeated operations is presented here. The peak voltage should still be restrained after a plurality of discharging processes. In order to solve these technical problems, a circuit protection device, in which cavities are disposed around the oppositely arranged electrodes, is disclosed.

PRIOR ART DOCUMENT

Patent Document

Patent Document 1: JP4247581
Patent Document 2: JP2008-244348

Patent Document 3: WO2010-061519
Patent Document 4: WO2010-061550

SUMMARY

However, although the ESD protection device disclosed in Patent Document 1 can adsorb the heat or stress generated in the discharging process by the hole portion which is disposed above the two opposite electrodes, the discharge inducing section (the ESD protection material) is only formed below the two opposite electrodes so that stable discharges may not happen.

In the technology disclosed in Patent Document 2, an ESD protection material is provided by filling composite particles between two oppositely disposed electrodes. In the composite particles, the conductive particles have their surfaces covered by inorganic glasses. Thus, it is not able to obtain an ESD protection device with high performance which is applicable to the high-speed transmission systems. In addition, the heat or stress derived from the discharge cannot be completely absorbed by small holes formed among composite particles. Thus, breakage occurs around the electrodes and fused materials are generated between electrodes. In this way, short-circuiting will happen between electrodes due to the agglomeration of fused materials.

The ESD protection device disclosed in Patent Document 3 has such a structure that the discharge inducing section are provided on the upper and lower surfaces of the oppositely disposed electrodes and a hole is formed in the middle. In such a structure, as the hole is quite long in width, stable discharges may not happen. When the conductive substances on the surfaces of the discharge inducing section are melted, the short-circuiting between electrodes may occur due to the agglomeration of fused materials.

In the ESD protection device disclosed in Patent Document 4, conductive powder form auxiliary electrode are dispersed between the discharge electrodes which exposed to the inside of the hole portion. This ESD protection device can adsorb the heat or stress derived by discharge. However, the accessorial electrode materials may be destroyed during the discharge.

In view of the problems mentioned above, the present invention aims to provide an ESD protection device with a low electrostatic capacitance, an excellent electrostatic adsorption property and an excellent durability. Also, such an ESD protection device can inhibit the damage from the short-circuiting and heat resistance and climate resistance as well as excellent productivity and economical efficiency.

In order to solve the technical problems mentioned above, the inventors provide a discharge inducing section around two oppositely disposed electrodes. This discharge inducing section consists of a conductive inorganic material and an insulating inorganic material and has a structure in which microscopic voids are dispersed. In addition, the discharge inducing section has a hollow space inside, wherein the hollow space is in a direction that two oppositely disposed electrodes are connected. Thus, an ESD protection device can be provided with a decreased short-circuiting rate or a reduced peak voltage because it has a low electrostatic capacitance, an excellent durability and can inhibit the damage from short-circuiting.

The hollow space is formed in a direction that the two oppositely disposed electrodes are connected, and the length of the hollow space necessarily ranges from a level that is half of the interval between two opposite electrodes to a level that is less than the length of the discharge inducing section. In addition, the width of the hollow space should be less than that of the discharge inducing section. In other words, the hollow space has to be formed inside the discharge inducing section. On the plane of the discharge inducing section where the hollow space is formed, a composite structure has to be employed in which conductive substances are discontinuously dispersed in the insulating material. With such a structure, the discharge occurs at the boundary between the discharge inducing section and the hollow space. Further, when a static voltage is applied, the plane formed with a hollow structure may be broken. However, in the condition that such breakage happened, the plane has a dense structure so that the drop off of the surface portion can be inhibited. In this way, after multiple discharge, the electrostatic adsorption property can be maintained. In addition, when excessive static voltage is applied, the discharge function can be maintained even if part of the surface portion of the plane formed with a hollow structure is melted during the discharge. This is because the inner side of this plane is exposed.

The discharge inducing section consists of a conductive inorganic material and an insulating inorganic material. In the discharge inducing section, microscopic voids are necessarily formed. The microscopic voids may adsorb the impact during the discharging process and can inhibit damage derived from short-circuiting by absorbing fused materials in the voids in the condition that the conductive particles are melted during the discharge. Such an effect can be achieved if the size of the gap is set to be 0.1 to 2 times of the average particle size of the conductive particles.

The distance between two oppositely disposed electrodes can be appropriately set as long as the desired discharging property is considered. Such a distance is usually about 1 to 50 μm. This distance is preferably about 7 to 30 μm, in terms of decreasing peak voltage.

After the measurements of performance of the ESD protection device mentioned above, the inventors confirmed that this ESD protection device has excellent electrostatic adsorption property, durability and peak voltage compared to the conventional ones. The functions owned by an ESD protection device can be still maintain after multiple discharge.

In the past, in such a gap type ESD protection device, discharge usually occurs in a place between the opposite electrodes where discharge occurs easily. Thus, once the discharge occurs, the next discharge will occur in the other. Thus, the discharging property tends to fluctuate. In anther respect, the place for discharging will be focused by providing a structure that a hollow space is formed in the discharge inducing section along the direction that the opposite electrodes are connected. Accordingly, the fluctuation of the discharging property will be decreased.

In conventional devices, if much excessive static voltage is applied and the discharge inducing section is subject to arc discharge, conductive fused materials are formed between opposite electrodes which occur short-circuiting between the opposite electrodes. In another respect, microscopic voids are formed in the discharge inducing section itself. Even if the discharge inducing section is melted due to the discharging process, the fused materials can run into the microscopic voids so that the short-circuiting between opposite electrodes due to the fused materials can be inhibited. In other words, when the discharge happens at the boundary between the discharge inducing section and the hollow space and fused materials are formed accordingly, let the fused materials loose into the microscopic voids in the inner side of the discharge induction section so that the short-circuiting at the discharging place can be inhibited. Further, as the surface portion of the discharge inducing section at the boundary between the discharge inducing section and the hollow space has a dense structure, damages can be prevented which may be caused by the dropping off of the discharging place due to the impact during the discharge. In this respect, especially the peak voltage can be suppressed to a low level, and the functions owned by an ESD protection device can be maintained after multiple discharge. A dense structure is used for the surface portion of the discharge inducing section while the discharge inducing section is porous with microscopic voids. Here, in order to provide the surface portion of the discharge inducing section with a dense structure, glass is used so that the region confined by the surface part has less voids. The ratio of the glass in the surface portion of the discharge inducing section should be 20 vol % or more so as to form such a structure.

The ESD protection device of the present invention possesses a substrate with a insulting surface, electrodes separately and oppositely disposed on the insulating surface with each other and a discharge inducing section which at least arranged between two electrodes, wherein the discharge inducing section has a composite structure that conductive particles, insulating particles and microscopic voids are dispersed therein. The discharge inducing section has a hollow structure which has a hollow space in a direction that the opposite electrodes are connected. An ESD protection device which has an excellent electrostatic adsorption property and an excellent durability and can inhibit the damage derived from short-circuiting or the peak voltage can be provided by forming a composite structure with conductive substances of the surface portion of the discharge inducing section discontinuously dispersed in the insulating materials and providing the surface portion of the discharge inducing section (at the boundary between the discharge inducing section and the hollow space) with a dense structure.

The other embodiments of the present invention involve composite electric components integrated with the ESD protection device of the present invention, i.e., the composite electric components have an inductance element in a magnetic substrate, which is integrated with the ESD protection device. The inductance element has a conductor pattern in the magnetic substrate. The ESD protection device has a structure having separately and oppositely disposed electrodes in the insulating substrate integrated with the magnetic substrate, and a functional layer with at least part of which disposed between the electrodes.

Based on such a structure, the ESD protection device of the present invention has a low electrostatic capacitance, a low rate of short-circuiting and an excellent durability. Also, the ESD protection device can inhibit the damage derived from short-circuiting or the peak voltage.

DETAILED DESCRIPTION OF EMBODIMENTS

Figure 1:
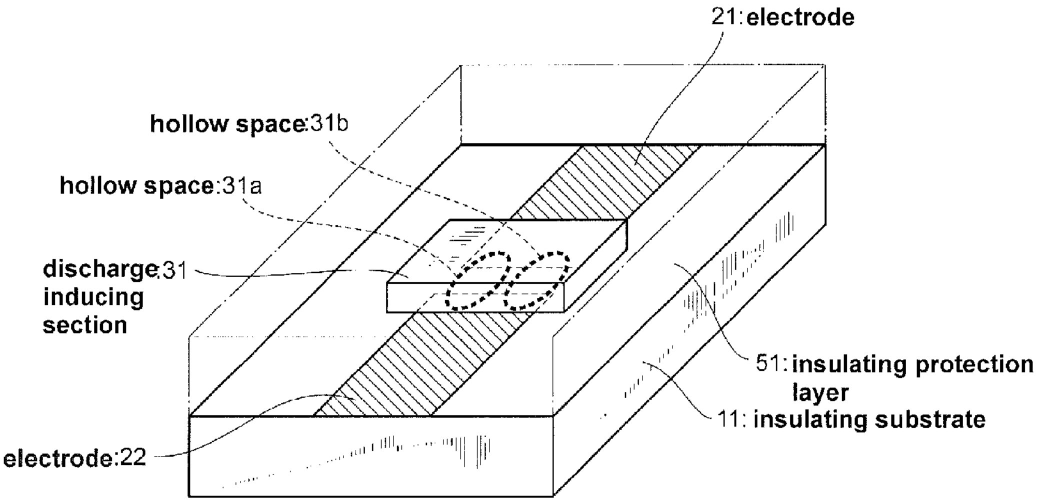
FIG. 1 is a stereogram schematically showing the ESD protection device 100.

Hereinafter, the embodiments of the present invention will be described. The same reference number is used for the same element, and the repeated descriptions will be omitted. The positional relationship is based on the drawings unless otherwise specified. In addition, the dimensional proportions are not limited to those shown in the drawings. Although the following embodiments are used to describe the present invention, the present invention is not limited to these embodiments.

First Embodiment

Figure 2:
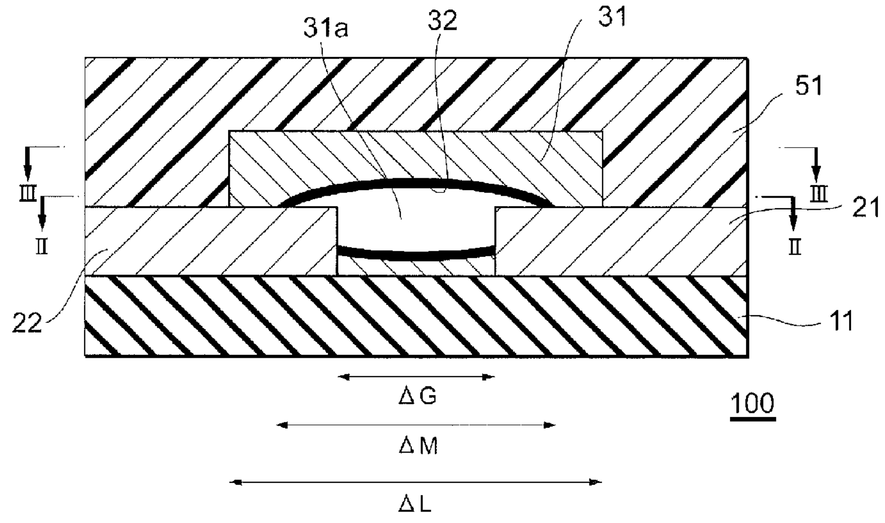
FIG. 2 is a sectional view schematically showing the ESD protection device 100.
Figure 3:
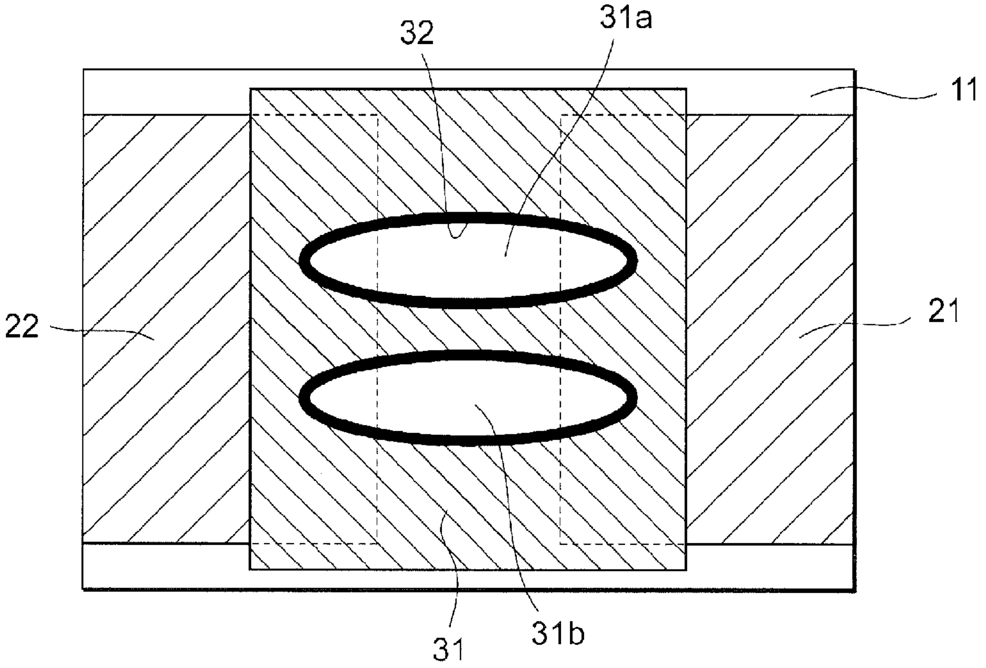
FIG. 3 is a sectional view along the line II-II shown in FIG. 2.

FIG. 1 is a stereogram schematically showing the ESD protection device of the present embodiment. FIG. 2 is a sectional view schematically showing the ESD protection device of the present embodiment. FIG. 3 is a sectional view along the line II-II shown in FIG. 2.

The ESD protection device 100 comprises an insulating substrate 11, a pair of electrodes 21 and 22 disposed on the insulating substrate 11, a discharge inducing section 31 arranged between the electrodes 21 and 22, terminal electrodes 41 electrically connected to the electrodes 21 and 22 (see FIG. 8) and an insulating protection layer 51 which covers the discharge inducing section 31. The discharge inducing section 31 has microscopic voids discontinuously dispersed therein. Also, it has a hollow structure in which one or more hollow space 31*a* and 31*b* are contained. Here, the pair of electrodes 21 and 22 is arranged that their front ends portion are exposed in these hollow space 31*a* and 31*b*. Further, in the ESD protection device 100, the discharge inducing section 31 functions as an ESD protection material which discharges at a low voltage. When an overvoltage such as static electricity is applied, the initial discharge between electrodes 21 and 22 can be ensured via the discharge inducing section 31 (hollow space 31*a* and 31*b*). Hereinafter, each constituent element will be specifically described.

The size and shape of the insulating substrate 11 are not particularly restricted as long as the insulating substrate can at least support the electrodes 21 and 22 and the discharge inducing section 31. Here, besides the substrate composed of an insulating material, the insulating substrate 11 also contains the concept of a substrate with an insulating film prepared on part or the whole surface.

The specific example of the insulating substrate 11 can be a ceramic substrate or a single crystal substrate which uses materials with a low dielectric constant such as $Al_2O_3$, $SiO_2$, MgO, AlN, $Mg_2SiO_4$ or the like with a dielectric constant being 50 or less, preferably 20 or less. In addition, a substrate with an insulating film composed of materials with a low dielectric constant (such as $Al_2O_3$, $SiO_2$, MgO, AlN, $Mg_2SiO_4$ or the like with a dielectric constant being 50 or less, preferably 20 or less) can be appropriately used on the surface of the ceramic substrate or the single crystal substrate. Then, for the insulating protection layer 51, a same substrate as the insulating substrate 11 can be used. The repeated description will be omitted below.

On the insulating substrate 11, a pair of electrodes 21 and 22 is separately arranged. In the present embodiment, the pair of electrodes 21 and 22 is separately disposed with a gap distance ΔG in almost the middle portion of the flat plane of the insulating substrate 11. Here, the gap distance ΔG refers to the shortest distance between electrodes 21 and 22. Further, ΔM refers to the major axis of the hollow space 31*a* and ΔL represents the length of the discharge inducing section 31.

As for the material for electrodes 21 and 22, it can be at least one metal selected from the group consisting of C, Ni, Al, Fe, Cu, Ti, Cr, Au, Ag, Pd and Pt or the alloy thereof. However, the material is not limited thereto. Also, in the present embodiment, the electrodes 21 and 22 can be rectangular in shape when viewed from top. However, this shape is not particularly restricted.

There is no particular restriction on the gap distance ΔG between the electrode 21 and 22, and the gap distance can be appropriately set based on the desired discharging property. Specifically, the ΔG is usually about 1 to 50 μm and is preferably 7 to 30 μm from the perspective that the initial discharge voltage is low level. In addition, the thickness of the electrodes 21 and 22 is not specifically restricted and generally ranges from 1 to 20 μm.

The method for forming the electrodes 21 and 22 are not particularly restricted, and well known methods can be appropriately selected. Specifically, the method can be enumerate as the coating method, transfer printing, electroplating, electroless plating, vapor plating or sputtering and the like for patterning the electrode layer with a desired thickness on the insulating laminate 11. In addition, the size of the electrodes 21 and 22 or gap distance ΔG can be processed by well-known methods such as ion milling, or etching. Also, the precursor of the metal or alloy can be patterned on the substrate by the screen printing with the use of a plate for patterning the gap portion between the electrodes 21 and 22. Thereafter, a firing process is provided so that the electrodes 21 and 22 are formed. Alternatively, the electrodes 21 and 22 can be formed by simultaneously firing the object that electrodes 21 and 22 are formed on a green sheet composed of insulators by screen printing. In addition, the gap portion between electrodes 21 and 22 can be formed by laser processing after the precursor of metal or alloy is coated by, for example, the electrode paste.

The discharge inducing section 31 is arranged between the electrodes 21 and 22. In the present embodiment, the discharge inducing section 31 is laminated on the insulating substrate 11 and electrodes 21 and 22. There are not particular restrictions on the size, shape and the position of the discharge inducing section 31 as long as the discharging process occurs between the electrodes 21 and 22 via the discharge inducing section 31 when an overvoltage is applied.

Figure 4:
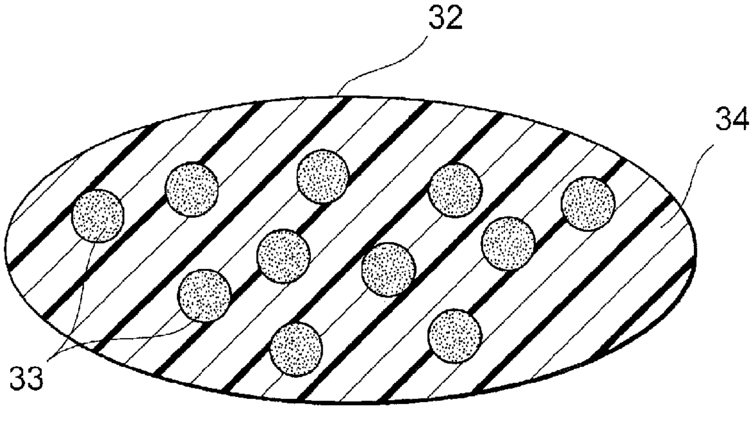
FIG. 4 is a stereogram schematically showing the surface portion 32 of the discharge inducing section.
Figure 5:
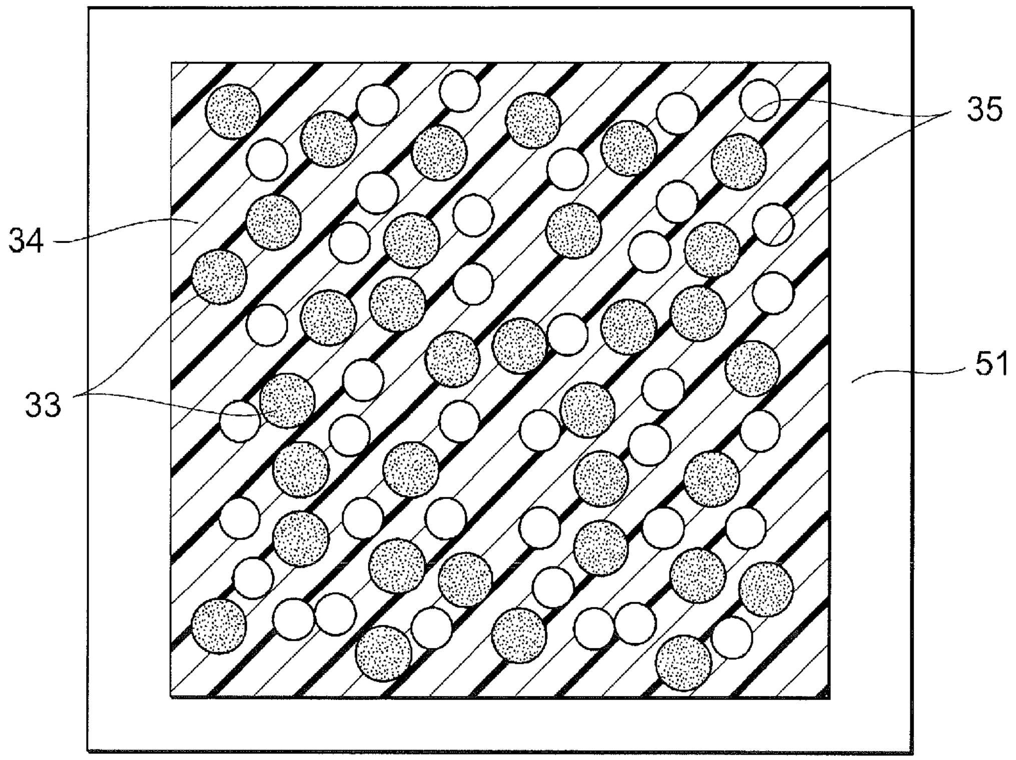
FIG. 5 is a sectional view along the line shown in FIG. 2.

FIG. 4 is a view schematically showing the surface portion 32 of the discharge inducing at the boundary between the discharge inducing section and the hollow space in the present embodiment. FIG. 5 is a sectional view along the line shown in FIG. 2. The discharge inducing section 31 has a hollow structure in which hollow space 31*a* and 31*b* are contained. In the present embodiment, a composite with conductive inorganic material 33 uniformly or randomly dispersed in the insulating inorganic material 32 can be used as the discharge inducing section 31. As shown in FIG. 5, the discharge inducing section 31 has microscopic voids 35 discontinuously dispersed therein. In other words, the discharge inducing section 31 of the present embodiment has a hollow structure by forming hollow space 31*a* and 31*b* and on the other hand the discharge inducing section 31 has microscopic voids 35 discontinuously dispersed therein. In addition, the surface portion of the discharge inducing section has dense structure.

The surface portion 32 of the discharge inducing section contains glass at a ratio of 20 vol % or more. If the ratio of the glass is less than 20 vol %, the surface portion of the discharge inducing section is expected to not able to have a dense structure, leading to damage around the surface portion of discharge inducing section at the boundary between the discharge inducing section and the hollow space during the discharge. That is, durability is evidently deteriorated. Thus, in order to form a dense structure, the ratio of the glass in the surface portion of the discharge inducing section is preferably more than 40 vol %. The range of the dense structure that the surface portion of the discharge inducing section has is not particularly restricted. Considering that the melting of conductive particles generate during the discharge, the thickness of the surface portion with dense structure having glass is preferred to be about 1 to 4 μm.

The specific examples of the insulating inorganic material 34 can be metal oxides but will not limited thereto. In view of the electrical insulation or cost issues, $Al_2O_3$, SrO, CaO, BaO, $TiO_2$, $SiO_2$, ZnO, $In_2O_3$, NiO, CoO, $SnO_2$, $V_2O_5$, CuO, MgO and $ZrO_2$ are preferred as the metal oxides. These materials can be used alone, or two or more of them can be used together. The character of the insulating inorganic material 32 is not particularly restricted. Specifically, it can be a uniform film of the insulating inorganic material 32, or it can be the particle agglomerates of the insulating material 32. Among these materials, $Al_2O_3$, $SiO_2$, $Mg_2SiO_4$ or the like are more preferable in view of insulation property. In order to provide the insulating matrix with semiconductor related properties, $TiO_2$ or ZnO is more preferable. An ESD protection device with a lower discharge starting voltage can be obtained by providing the insulating matrix with semiconductor related properties.

The specific examples of the conductive inorganic material 33 can be metal, alloy, metal oxide, metal nitride, metal carbide, metal boride or the like but are not limited thereto. In view of the electrical conductivity, C, Ni, Al, Fe, Cu, Ti, Cr, Au, Ag, Pd and Pt or the alloy thereof are preferable.

The surface portion 32 of discharge inducing section viewed from the hollow structure side of the discharge inducing section 31 is as shown in FIG. 4. Also, it is characterized in that it has a composite structure in which conductive inorganic material 33 is discontinuously dispersed in the insulator and the surface portion 32 of the discharge inducing section has a dense structure. With such a composite portion, the discharge is likely to occur and proceed under a low voltage. Further, as the composite portion is one with conductive inorganic material dispersed in the insulator, the insulation of the device can be maintained before or after the discharge.

The microscopic voids 35 make the discharge inducing section 31 porous and adsorb the heat or stress generated during the discharge. In this way, the damage due to the melting or deformation of the electrodes 21 and 22 and their peripheral substances can be alleviated. Here, in the present specification, the microscopic voids 35 refers to a gap with a size of 0.1 to 5 μm. Further, in the present specification, the size of the microscopic voids 35 refers to the median size (D50) of a globular shape with an aspect ratio of 1 to 5, or refers to the arithmetic mean of the major axis or minor axis in other shapes. That is, the size is the mean from randomly chosen 50 points. The size of the microscopic voids 35 or the volume ratio of the microscopic voids 35 to the discharge inducing section 31 is not particularly restricted and can be appropriately set based on desired electrostatic adsorption property, durability against repeated discharges and prevention of short-circuiting between electrodes 21 and 22. The size of the microscopic voids 35 is preferably 0.1 to 2 and the microscopic voids are preferably contained with a ratio of 1 to 40 vol %, and more preferably 5 to 20 vol %.

The surface portion of the discharge inducing section at the boundary between the discharge inducing section 31 and the hollow space has a dense structure, and this structure is obtained by providing glass. The surface portion of the discharge inducing section preferably contains 20 vol % or more of glass components. With such a dense structure of the surface portion of the discharge inducing section, the breakage due to the stress generated during discharge can be inhibited. In this way, a device can be obtained with an excellent electrostatic adsorption property, an excellent durability against repeated discharges or a low peak voltage. Further, the region of the surface portion of the discharge inducing section with a dense structure preferably has a thickness of 1 to 4 μm in a direction in depth from the hollow space to the discharge inducing section as shown in the sectional view of FIG. 2.

The number of the hollow space in the discharge induction section 31 is not particularly limited. In the present embodiment, a hollow structure is employed with two hollow spaces 31*a* and 31*b*. However, the number of the hollow space is not limited and can be one or several. As the number of the hollow space increases, the frequency of discharge will decrease relative to one hollow space, resulting in further improved durability against repeated uses. In addition, when several hollow space are disposed, the shape and size of each one can be the same or different.

Also, there is no particular restriction on the shape of the hollow space 31*a* and 31 *b*. Any shape can be used such as the sphere and ellipsoid-like shape, and the hollow space can also be indefinite shape. Especially, the hollow space 31*a* and 31*b* are preferred to be a shape extending in a direction that the electrodes 21 and 22 are connected. With such hollow space 31*a* and 31*b*, the discharge generated between electrodes 21 and 22 is performed at the boundary between the hollow space and the surface portion of the discharge inducing section. Thus, the deterioration of the discharge inducing section becomes less and the durability is improved. Further, the fluctuation of the peak voltage or the discharge starting voltage can be inhibited.

In another respect, the size of the hollow space 31*a*,31*b* is not particularly restricted. However, if the disruption due to discharges is to be inhibited and the durability is to be improved, the ΔM (the length of the hollow space 31*a*,31*b* in a direction that the hollow space connects the electrodes 21 and 22) preferably ranges from a half of the gap distance ΔG between electrodes 21 and 22 to a level less than the length ΔL of the discharge inducing section 31. In addition, the length of the hollow space 31*a*,31*b* in a direction that the hollow space connects the electrodes 21 and 22 refers to the longest length of the hollow space 31*a*,31*b* in a direction that the hollow space connects the electrodes 21 and 22. The length of discharge inducing section 31 refers to the longest length of the discharge inducing section 31 in a direction that the hollow space connects the electrodes 21 and 22. For example, when the gap distance ΔG is about 10 to 20 μm in the ESD protection device 100, the length of the hollow space 31*a*,31*b* in a direction that the hollow space connects the electrodes 21 and 22 is 5 to 10 μm or more and this length is less than the length of the discharge inducing section 31. As shown in FIG. 2 and FIG. 3, the length of the hollow space 31*a*,31*b* in a direction that the hollow space connects the electrodes 21 and 22 is set to be the gap distance ΔG between electrodes 21 and 22 or more so that the front ends of electrodes 21 and 22 protrude from the hollow space 31*a* and 31*b* respectively. In this respect, the damage to the discharge inducing section due to the discharge between electrodes 21 and 22 can be inhibited.

Thus, the deterioration of the discharge inducing section becomes less and the durability is improved. Further, the fluctuation of the peak voltage or the discharge starting voltage can be inhibited.

There is no particular restriction on the thickness of the discharge inducing section 31. That is, the thickness can be properly set and preferably ranges from the thickness of the corresponding electrode to half of the thickness of the device or less if the durability is to be improved.

The method for forming the discharge inducing section 31 is not particularly restricted. For example, the well known process for film formation as well as the lamination process can be used. The method described below is also suitable. Specifically, in a construction which contains a specified ratio of microscopic voids 35 with a desired size, in order to well reproduce the discharge inducing section 31 in an easy way, a mixture is coated which contains insulating inorganic materials, conductive inorganic materials and resins, wherein the resin is used to form microscopic voids 35 and will be removed during the firing process. Thereafter, the resultant product obtained by mixing the removable material, which is used to form the hollow space 31*a* and 31*b* on the desired position of the mixture, and glass, which makes the surface portion of the hollow space dense, is coated in a required shape. Then, a firing process is provided so that the removable material disappear. In this way, a porous structure with microscopic voids 35 is formed and a hollow structure is defined and formed in which the surface portion of the discharge inducing section at the boundary with the hollow space is provided with a dense structure. The method for providing the surface portion of the discharge inducing section with a dense structure can be one in which the resin paste for forming the hollow structure contains glass and the removable materials is volatized during the firing process in order to make the surface portion of the discharge inducing section dense. Alternatively, another method can be used that the discharge inducing section contains glass and the glass precipitate at the boundary between the hollow space and the discharge inducing section during the firing process so that the surface portion of the discharge inducing section becomes dense. However, the method is not limited thereto. Hereinafter, the preferable method for forming the discharge inducing section 31 will be described.

In this method, a mixture is prepared to contain insulating inorganic materials, conductive inorganic materials and a removable material which is used to form the microscopic voids 35, and the mixture is coated or printed on the gap between electrodes 21 and 22. Then, the mixture of the removable material which is used to form the hollow space 31*a* and 31*b* and the glass is coated or printed to a desired shape on a specified position of the mixture provided to the gap between electrodes 21 and 22. Thereafter, alternatively, the mixture mentioned above can be provided via coating or printing on a specified position of the paste for forming the discharge inducing section and the paste for forming the microscopic voids. Then, a firing process is provided so that the removable material is thermally degraded or volatized. A structure containing a specified ratio of microscopic voids 35 with a desired size can be obtained by removing the removable material during the firing process. Further, a discharge inducing section 31 can be obtained with a hollow structure in which the hollow space 31*a* and 31*b* with a desired shape are formed on a desired position and the surface portion of the discharge inducing section has a dense structure. Here, the treatment conditions during the firing process are not particularly restricted. In view of the productivity and economical efficiency, the firing process is preferably performed under air atmosphere at 500 to 1200° C. for 10 minutes to 5 hours.

Furthermore, these is no particular restriction on the removable material as long as this material will disappear (thermally degraded or volatized) during the firing process. Well known materials can be appropriately selected. The specific examples of such materials are not particularly restricted and can be resin particles or a mixed substance of a medium and resins (i.e., the resin paste). The representative resin particle can be a resin particle with an excellent thermal decomposability such as acrylic resins. Further, the shape of the resin particle is not particularly restricted and can be any one of the hammer-like shape, the column-like shape, the sphere-like shape with an aspect ratio of 1 to 5, the ellipsoid-like shape with an aspect ratio above 5 or the like. Also, the resin particle can be indeterminate form. Further, the representative resin pastes can be pastes obtained by mixing resins such as the acrylic resin, ethyl cellulose and polypropylene in a well known medium, wherein said resins are thermally degraded, volatized and then disappear during the firing process. Here, when the microscopic voids 35 are formed by resin particles, the particle size of the resin particles can be appropriately set in order to get the microscopic voids 35 with a desired size. The particle size is not particularly limited and is preferably 0.1 to 4 μm. Furthermore, in the present specification, the particle size of the resin particles refers to the median diameter (D50) in a sphere-like shape and refers to the arithmetic mean of the major axis and minor axis in other shapes. In this respect, the ratio of the resin particles is not particularly restricted and can be properly set based on the ratio of microscopic voids 35 contained in the discharge inducing section 31. This ratio is preferably about 1 to 30 vol %. During the preparation of the mixture, various additives such as the solvent and the binder can be added. When resin paste is used to form the hollow space 31*a* and 31*b*, the solid concentration or the viscosity of the resin paste can be properly adjusted in order to get the hollow space 31*a* and 31*b* with a desired shape or size. Further, during the preparation of the resin paste or the coating or printing process of the resin paste, various additives can be added such as a solvent or a surfactant or a tackifier. The hollow space 31*a* and 31*b* can also be prepared by a construction formed by resins or fibers, wherein this construction has a shape corresponding to the hollow space 31*a* and 31*b* with a desired shape and size and will be thermally degraded, volatized or removed during the firing process, and this construction can be used to replace the removable material or can be used together with the removable material.

In the ESD protection device 100 of the present embodiment, the composite (i.e., the discharge inducing section 31) with the conductive inorganic material 33 discontinuously dispersed in the insulating inorganic material functions as an ESD protection material with a large insulation resistance, a low electrostatic capacitance and an excellent discharging property. Then, the discharge inducing section 31 is composed of the structure that microscopic voids discontinuously disperse and has a hollow structure in which hollow space 31*a* and 31*b* are contained therein. Thus, the damage to the periphery of the electrodes and the damage to the discharge inducing section are alleviated. Accordingly, the repeating durability is significantly improved. The durability is further improved by making the surface portion of the discharge inducing section a dense structure. In addition, the discharge inducing section 31 is composed of a composite consisting of an inorganic material, so the heat resistance is further improved. Further, the properties will hardly change in accordance with the environment such as the temperature or humidity, so the reliability is elevated. The discharge inducing section 31 has a structure that the fused materials generated during the discharging process will hardly agglomerate on one site, so the short-circuiting between the electrodes 21 and 22 can be effectively prevented. In view of the reasons above, an ESD protection device 100 with good performance will be obtained which has a low electrostatic capacitance, an excellent electrostatic adsorption property. Also, in such an ESD protection device, the discharge durability is improved, the peak voltage is suppressed to a low level, and the short-circuiting between electrodes after discharges is inhibited, and an excellent heat resistance and an excellent climate resistance can be obtained.

EXAMPLES

Hereinafter, the present invention will be specifically described based on Examples. However, the present invention will not be limited thereto.

Example 1

Figure 6:
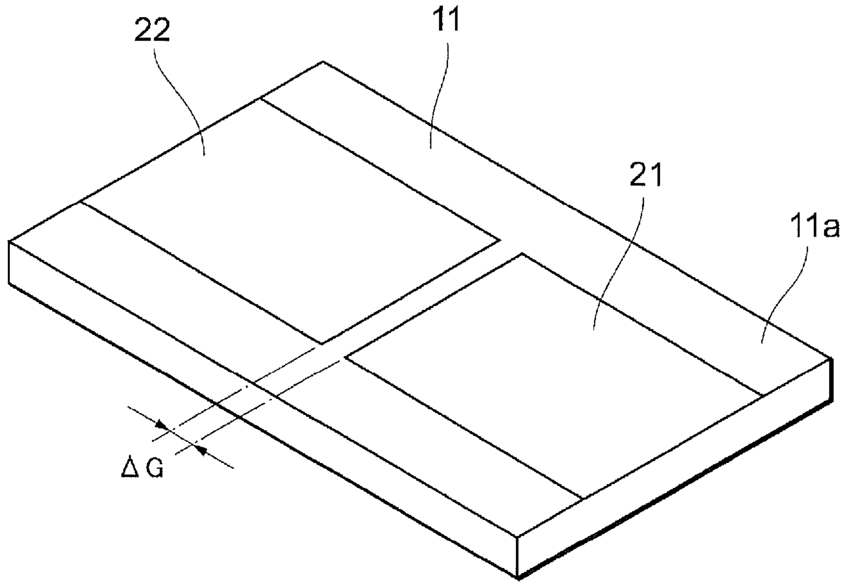
FIG. 6 is a stereogram schematically showing the preparation process of the ESD protection device 100.

First of all, a green sheet obtained by making the materials consisting of the main component $Al_2O_3$ and the glass component into a sheet was used as an insulating substrate 11 shown in FIG. 6. An Ag paste was printed with a thickness of 20 μm on one insulating surface 11*a* by screen printing so as to pattern and form a pair of oppositely disposed strip-like electrodes 21 and 22. As for the pair of printed electrodes, the length of each of electrodes 21 and 22 was both 0.5 mm and the width was 0.4 mm, and the gap distance ΔG between two electrodes 21 and 22 was 40 μm.

Figure 7:
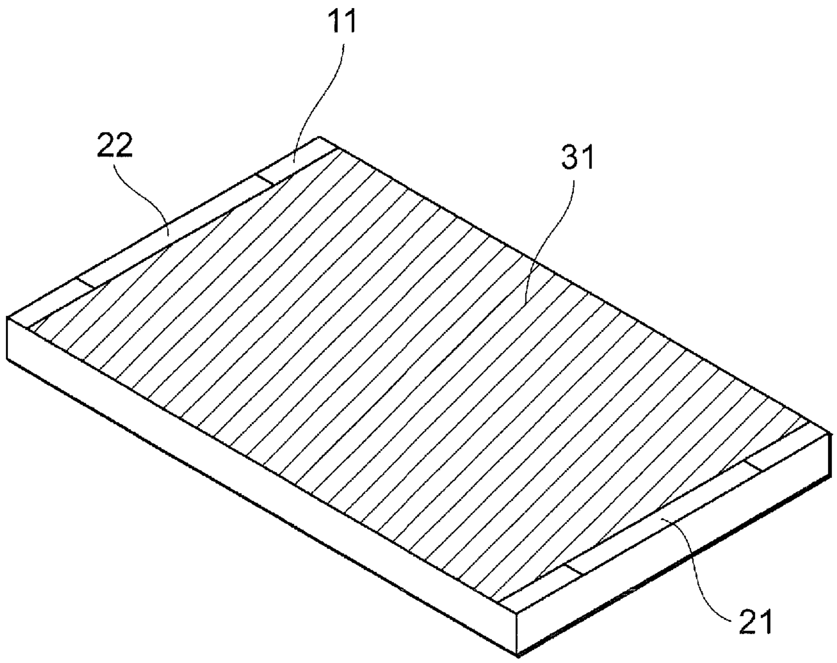
FIG. 7 is a stereogram schematically showing the preparation process of the ESD protection device 100.

As shown in FIG. 7, a discharge inducing section 31 was formed on the insulating substrate 11 and the electrodes 21 and 22 in the following orders.

First of all, glass particles with $SiO_2$ as the main component (which are used as the insulating inorganic material 34) (trade name: ME13, prepared by Nihon Yamamura Glass Co., Ltd) being 10 vol %, $Al_2O_3$ with an average particle size of 1 μm (which is used as the insulating inorganic material 34) (trade name: AM-27, prepared by Sumitomo Chemical Co., Ltd) being 60 vol %, Ag particles with an average particle size of 1 μm (which are used as the conductive inorganic material 33) (trade name: SPQ05S, prepared by Mitsui Kinzoku Co., Ltd) being 30 vol % and spherical acrylic resin particles with an average particle size of 1 μm (which are used to form microscopic voids 35) being 30 vol % (trade name: MX-150, prepared by Soken Chemical & Engineering Co., Ltd.) were measured and mixed to obtain a mixture. Besides, a lacquer with a solid concentration of 8 mass % was prepared by mixing the ethyl cellulose-based resin as a binder and the terpineol as a solvent. Next, the lacquer was added into the obtained mixture mentioned above. Then, they were mixed to prepare a paste mixture for the formation of discharge inducing section.

Thereafter, the acrylic resin was mixed into the butyl carbitol, and a resin paste with a solid concentration of 40 mass % was formed for the preparation of hollow space 31*a* and 3 lb. The glass particles mentioned above were mixed in the resin paste, and a paste-like mixture mixed with the glass, which was for the formation of the hollow space, was prepared.

Then, the obtained paste-like mixture (which was for the formation of discharge inducing section) was coated in a small amount by screen printing to cover the insulating surface 11*a* of the insulating substrate 11 between electrodes 21 and 22. In order to form hollow space 31*a* and 31*b* on the coated mixture and electrodes 21 and 22, the paste-like mixture for the formation of hollow space was screen printed on two sites in an ellipsoid-like shape. After that, a screen printing was performed to cover the paste-like mixture for the formation of the discharge inducing section and the coated ellipsoidal paste-like mixture for the formation of the hollow space so that a precursor of the discharge inducing section 31 similar to that shown in FIG. 1 was formed. After the green sheet was laminated on the precursor of the discharge inducing section 31, a laminate was prepared by a hot pressing. Thereafter, the obtained laminate was cut into individual pieces with a specified size. The individual pieces of laminates were subjected to the thermal treatment at 200° C. for 1 hour (the process of removing the binder). Then, the temperature was raised with a rate of 10° C./min and the individual pieces of laminates were kept under air atmosphere at 950° C. for 30 minutes. With such a firing treatment, the acrylic resins, ethyl cellulose based resins and the solvent were removed from the precursor of the discharge inducing section 31. As a result, a construction was formed with microscopic voids 35 discontinuously dispersed therein. Then, a discharge inducing section 31 was prepared in which a hollow structure was formed (which has hollow space 31*a* and 31*b* formed therein) and the surface portion of the discharge inducing section has a dense structure. Further, the gap distance ΔG between the pair of fired electrodes 21 and 22 was about 30 μm and the length ΔM of each of the hollow space 31*a* and 31*b* was 40 μm in a direction that the electrodes 21 and 22 are connected.

Figure 8:
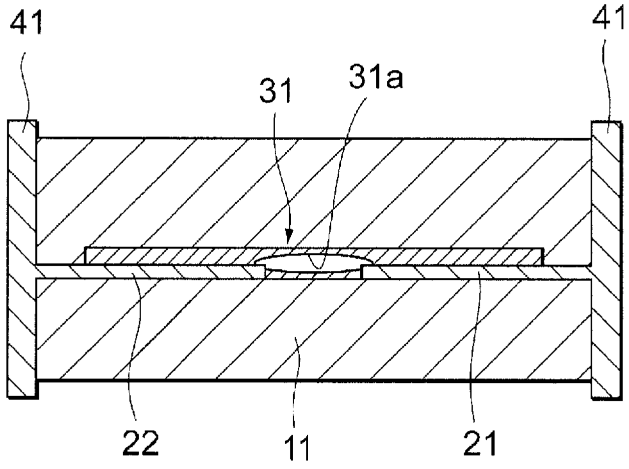
FIG. 8 is a stereogram schematically showing the preparation process of the ESD protection device 100.

As shown in FIG. 8, a terminal electrode 41 with Ag as the main component was formed by connecting to the outside ends of the electrodes 21 and 22. In this way, the ESD protection device 100 of Example 1 was obtained.

Example 2

A discharge inducing section 31 (which was formed by a construction with microscopic voids 35 discontinuously dispersed and had a hollow structure in which one hollow space 31*a* was contained) was prepared in the same way as in Example 1 except that the screen printing was applied to only one site in an ellipsoid-like shape during the screen printing process of the paste-like mixture for the formation of the hollow space. In this way, the ESD protection device 100 of Example 2 was obtained.

Comparative Example 1

A discharge inducing section without a hollow structure (which was formed by a construction with microscopic voids 35 discontinuously dispersed) was prepared in the same way as in Example 1 except that, while the paste-like mixture for formation of hollow space is screen printed, the paste-like mixture for the formation of discharge inducing section was used instead of the paste-like mixture for formation of hollow space. In this way, the ESD protection device of Comparative Example 1 was obtained.

Comparative Example 2

A discharge inducing section without a hollow space (which was formed by a construction with microscopic voids 35 discontinuously dispersed) was prepared in the same way as in Example 1 except that spherical acrylic resin particles with an average particle size of 2.0 μm (trade name: MX-200, prepared by Soken Chemical & Engineering Co., Ltd.) was used to form microscopic voids 35 instead of spherical acrylic resin particles with an average particle size of 1.0 μm (trade name: MX-150, prepared by Soken Chemical & Engineering Co., Ltd.). In this way, the ESD protection device of Comparative Example 2 was obtained.

Example 3

A discharge inducing section 31 (which was formed by a construction with microscopic voids 35 discontinuously dispersed and had a hollow structure in which hollow space 31*a* and 31*b* were contained) was prepared in the same way as in Example 1 except that spherical acrylic resin particles with an average particle size of 1.0 μm (trade name: MX-150, prepared by Soken Chemical & Engineering Co., Ltd.) for formation of microscopic voids 35 were used and the discharge inducing section is changed to 10 vol % of glass particles, 50 vol % of $Al_2O_3$, 30 vol % of Ag particles and 10 vol % of acrylic resin particles. In this way, the ESD protection device 100 of Example 3 was obtained.

Example 4

A discharge inducing section 31 (which was formed by a porous construction with microscopic voids 35 discontinuously dispersed and had a hollow structure in which one hollow space 31*a* was contained) was prepared in the same way as in Example 2 except that 10 vol % of glass particles, 50 vol % of $Al_2O_3$ and 30 vol % of Ag particles were used to form the discharge inducing section and 10 vol % of acrylic resin particles MX-150 was replaced by 10 vol % of spherical acrylic resin particles with an average particle size of 2.0 μm (trade name: MX-300, prepared by Soken Chemical & Engineering Co., Ltd.). In this way, the ESD protection device 100 of Example 4 was obtained.

Example 5

A discharge inducing section 31 (which was formed by a construction with microscopic voids 35 discontinuously dispersed and had a hollow structure in which hollow space 31*a* and 31*b* were contained) was prepared in the same way as in Example 3 except that 10 vol % of glass particles, 50 vol % of $Al_2O_3$ and 30 vol % of Ag particles were used to form the discharge inducing section, and 10 vol % of acrylic resin particles MX-150 were used and two hollow space were contained. In this way, the ESD protection device 100 of Example 5 was obtained.

Comparative Example 3

A discharge inducing section without a hollow structure (which was formed by a construction with microscopic voids 35 discontinuously dispersed) was prepared in the same way as in Comparative Example 1 except that 10 vol % of glass particles, 50 vol % of $Al_2O_3$ and 30 vol % of Ag particles were used to form the discharge inducing section and 10 vol % of acrylic resin particles MX-150 were used. In this way, the ESD protection device 100 of Comparative Example 3 was obtained.

Comparative Example 4

A discharge inducing section without a hollow structure (which was formed by a construction with microscopic voids 35 discontinuously dispersed) was prepared in the same way as in Comparative Example 3 except that 10 vol % of acrylic resin particles MX-150 were replaced with 10 vol % of spherical acrylic resin particles with an average particle size of 3.0 μm (trade name: MX-300, prepared by Soken Chemical & Engineering Co., Ltd.). In this way, the ESD protection device of Comparative Example 4 was obtained.

Comparative Example 5

A discharge inducing section 31 (which was formed by a construction with microscopic voids 35 discontinuously dispersed and had a hollow structure in which one hollow space 31*a* was contained and the surface portion of discharge inducing section does not have a dense structure) was prepared in the same way as in Example 3 except that the process of adding glass is omitted during the preparation of paste-like mixture for formation of hollow space. In this way, the ESD protection device 100 of Comparative Example 5 was obtained.

Comparative Example 6

A discharge inducing section without microscopic voids 35 or a hollow space was prepared in the same way as in Comparative Example 1 except that the acrylic resin particles were not added and the ratios for each component were changed to 15 vol % of glass particles, 55 vol % of $Al_2O_3$ and 30 vol % of Ag particles. In this way, the ESD protection device 100 of Comparative Example 5 was obtained.

<Observation on Structure>

In each ESD protection devices 100 of Examples 1 to 5 obtained above, the section of the discharge inducing section 31 was polished and then observed by SEM. It had been determined that all were constructions with microscopic voids 35 discontinuously dispersed. Further, a hollow structure was contained with 1 or 2 hollow space and the surface portion of the discharge inducing section had a dense structure.

<Observation on Microstructure>

In each ESD protection devices 100 of Examples 1 to 5 obtained above, the section of the discharge inducing section 31 (the section where hollow space 31*a* and 31*b* were not formed) was polished. These sections were observed by SEM and photos were taken. In the photos, the images of the microscopic voids were processed and the sum of the areas of these microscopic voids was calculated. Then, the ratio of the microscopic voids was obtained by dividing the sum by the total areas.

<Electrostatic Discharge Test>

Figure 9:
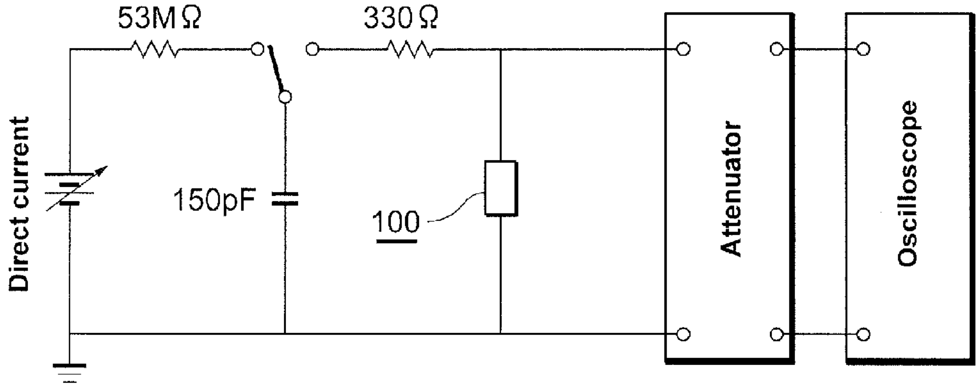
FIG. 9 shows the circuit diagram in the ESD discharge test.

The electrostatic discharge test was performed for the ESD protection devices 100 of Examples 1 to 5 and Comparative Examples 1 to 6 by using the circuit shown in FIG. 9. The test results were shown in Table 1 and Table 2.

The electrostatic discharge test was carried out following the human body model (discharge resistance was 330Ω, discharge capacitance was 150 pF, applied voltage was 8.0 kV, contact discharge) based on the IEC61000-4-2 electrostatic discharge immunity test and the noise test. Specifically, as shown in the circuit for electrostatic test in FIG. 9, one terminal electrode of the ESD protection device as the evaluation subject was connected to the ground while the other terminal electrode was connected to the electrostatic pulse applying portion so that the electrostatic pulses were applied when the electrostatic pulse applying portion contacted the discharge gun. Here, the applied electrostatic pulse provides a voltage above the discharge starting voltage.

The electrostatic discharge test was performed while the discharge starting voltage was firstly set as 0.4 kV and then was increased by 0.2 kV at each round. The observed waveforms of the electrostatic adsorption were recorded, and the voltage at which the electrostatic adsorption effect was revealed was used as the discharge starting voltage. The electrostatic capacitance was the electrostatic capacitance (pF) at 1 MHz. As for the short-circuiting rate, 100 samples for each were prepared, and the electrostatic discharge test was repeated for 100 times at 8.0 kV. The number of occurrence of short-circuiting between electrodes was counted and was shown by its ratio (%). With respect to the durability, 100 items were prepared for each sample, and the electrostatic discharge test was repeated for 1000 times at 8.0 kV. The peak voltage at the 1000th discharge was measured for each sample. The number of samples with the peak voltage being 400V or less was counted and was shown by its ratio (%). Further, the same discharge test was performed for the peak voltage. Specifically, the 1000th peak voltage was measured for each sample and the mean was calculated. The lower the peak voltage was, the better the electrostatic adsorption effect was, which was good for an ESD protection device.

TABLE 1

| | Comparative Example 1 | Comparative Example 2 | Example 1 | Example 2 |
|---|---|---|---|---|
| Ratio of insulating inorganic materials [vol %] | 40 | 40 | 40 | 40 |
| Ratio of conductive inorganic materials [vol %] | 30 | 30 | 30 | 30 |
| Average diameter of microscopic voids [μm] | 1.0 | 2.0 | 1.0 | 1.0 |
| Ratio of microscopic voids [vol %] | 30 | 30 | 30 | 30 |
| With or without hollow space | — | — | Two sites | One site |
| With or without a dense structure in surface portion of hollow space | — | — | with | with |
| Discharge starting voltage [kV] | 2.6 | 3.4 | 3.0 | 2.6 |
| Electrostatic capacitance (pF) | 0.17 | 0.15 | 0.12 | 0.13 |
| Short-circuiting ratio [%] | 40 | 35 | 0 | 0 |
| Durability [%] | 60 | 60 | 95 | 85 |
| Peak voltage [V] | 470 | 460 | 260 | 250 |

TABLE 2

| | Comparative Example 3 | Comparative Example 4 | Example 3 | Example 4 | Example 5 | Comparative Example 5 | Comparative Example 6 |
|---|---|---|---|---|---|---|---|
| Ratio of insulating inorganic materials [vol %] | 60 | 60 | 60 | 60 | 60 | 60 | 70 |
| Ratio of conductive inorganic materials [vol %] | 30 | 30 | 30 | 30 | 30 | 30 | 30 |
| Average diameter of microscopic voids [μm] | 1.0 | 2.0 | 1.0 | 2.0 | 1.0 | 1.0 | — |
| Ratio of microscopic voids [vol %] | 10 | 10 | 10 | 10 | 10 | 10 | — |
| With or without hollow space | — | — | One site | One site | Two sites | One site | — |
| With or without a dense structure in surface portion of hollow space | — | — | with | with | with | without | — |
| Discharge starting voltage [kV] | 2.0 | 2.4 | 2.0 | 2.6 | 2.2 | 2.0 | 1.6 |
| Electrostatic capacitance (pF) | 0.16 | 0.15 | 0.13 | 0.12 | 0.11 | 0.13 | 0.20 |
| Short-circuiting ratio [%] | 30 | 25 | 0 | 0 | 0 | 0 | 95 |
| Durability [%] | 50 | 50 | 85 | 85 | 90 | 50 | 30 |
| Peak voltage [V] | 450 | 470 | 270 | 250 | 260 | 400 | 800 |

It can be seen from Table 1 and Table 2 that the ESD protection devices of Examples 1 to 5 all had a discharge starting voltage lower than 2 kV and an electrostatic capacitance lower than 0.2 pF. Thus, they had good performance and were applicable to high-speed transmission system. Further, the occurrence of short-circuiting between electrodes was significantly inhibited in the ESD protection devices from Examples 1 to 5. Also, based on the results of the discharge test, for the ESD protection devices of Examples 1 to 5, the durability against repeated discharge was excellent and the peak voltage was suppressed to a low level.

Figure 10:
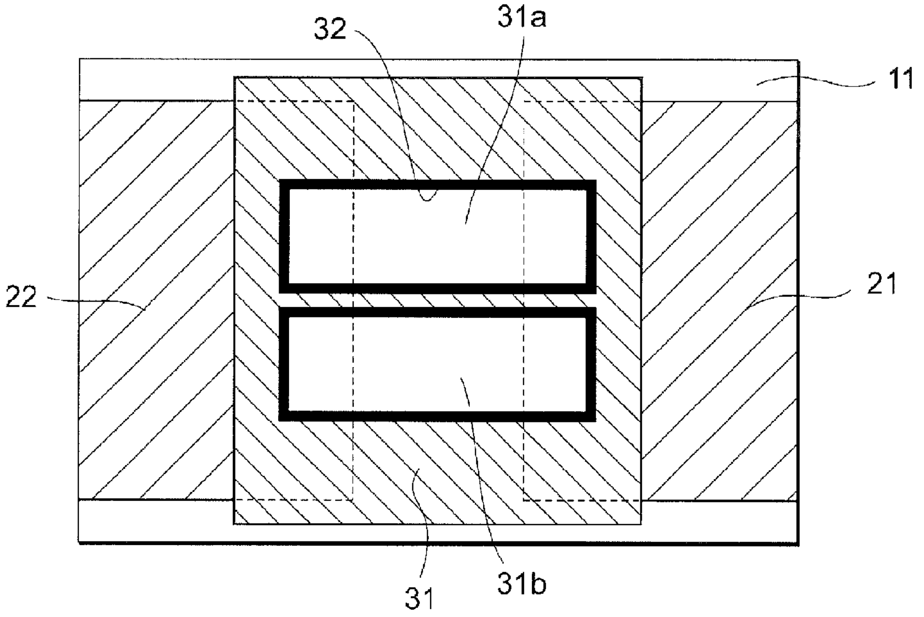
FIG. 10 is a schematic sectional view showing a first modification.
Figure 11:
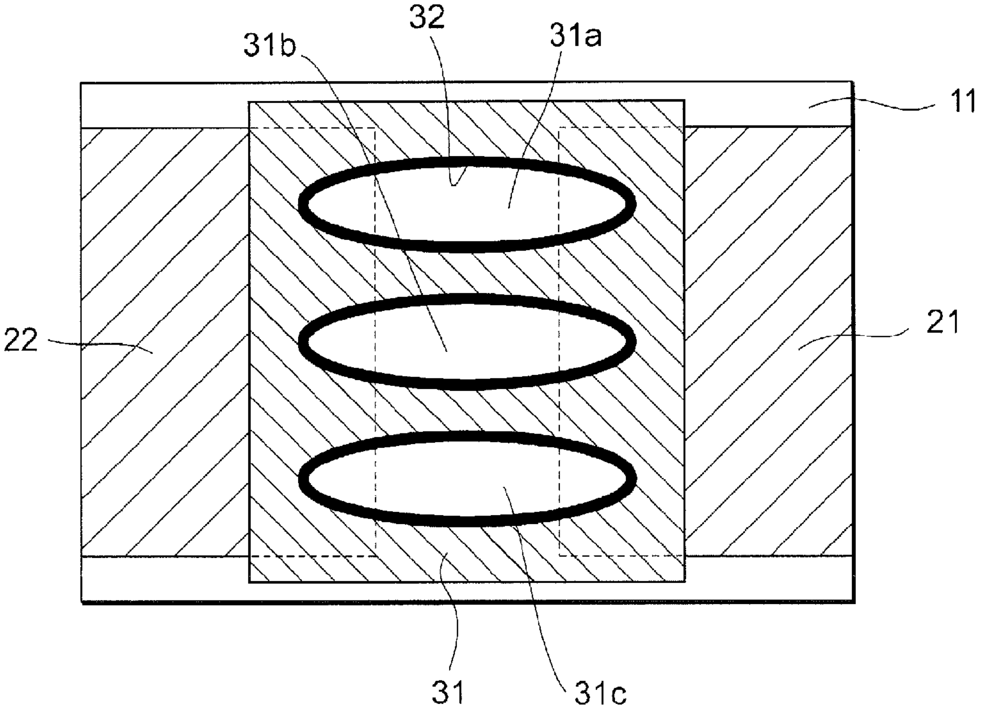
FIG. 11 is a schematic sectional view showing a second modification.
Figure 12:
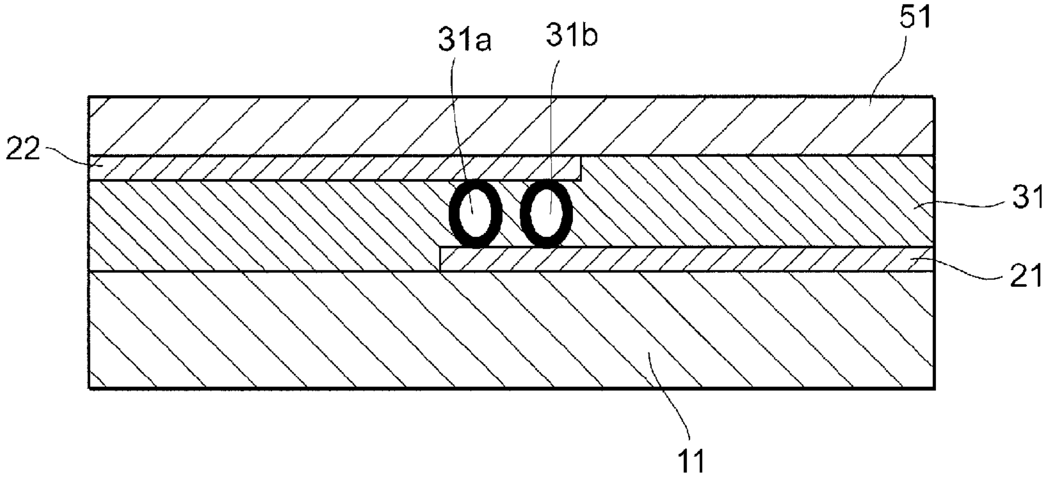
FIG. 12 is a schematic sectional view showing a third modification.

The present invention is not limited to the embodiments and examples mentioned above, and various modifications may be made without changing the spirit. For example, the number, shape, size and layout of the hollow space 31*a* and 31*b* can be changed. Specifically, for example, as shown in FIG. 10, two hollow space 31*a* and 31*b* can be made in a prism-like shape. Further, three hollow space 31*a*, 31*b* and 31*c* can be provided, as shown in FIG. 11. Otherwise, as shown in FIG. 12, one electrode 21 can be disposed on the insulting substrate 11 and the other electrode 22 can be arranged on the insulating protection layer 51 so that the pair of electrodes 21 and 22 are separately and oppositely disposed.

INDUSTRIAL APPLICATION

As described above, the ESD protection device of the present invention has a low electrostatic capacitance and an excellent durability against repeated discharge. The short-circuiting between electrodes can be inhibited and the peak voltage can be inhibited to a low level. In addition, the ESD protection device of the present invention has an excellent heat resistance and an excellent climate resistance. Also, the productivity and economical efficiency can be elevated. Thus, it can be widely and effectively used in electric or electrical devices having ESD protection devices and various machines, equipments and systems containing these electric or electrical devices.

DESCRIPTION OF REFERENCE NUMERALS

11 insulating substrate
11*a* insulating surface
21,22 electrode
21 discharge inducing section
31*a*-31*c* hollow space
32 surface portion of the discharge inducing section
33 conductive inorganic material
34 insulating inorganic material
35 microscopic voids
41 terminal electrode
51 insulating protection layer
100 ESD protection device
ΔG gap distance
ΔM length of hollow space 31*a*,31*b* in a direction that electrodes 21 and 22 are connected
ΔL length of discharge inducing section 31

What is claimed is:

1. An ESD protection device, comprising an insulating substrate, electrodes separately and oppositely disposed on the insulating substrate and a discharge inducing section arranged between the electrodes, wherein said discharge inducing section consists of porous material in which microscopic voids are discontinuously dispersed, has a hollow structure which contains at least one hollow space, and a plane that is exposed to and surrounds the hollow space, the plane having a density that is greater than a density of other portions of the discharge inducing section that are separated from the hollow space by the plane.

2. The ESD protection device of claim 1, wherein, the plane of said discharge inducing section where the hollow structure is formed has a composite structure in which at least one conductive inorganic material is discontinuously dispersed in a matrix of at least one insulating inorganic material.

3. The ESD protection device of claim 1, wherein, the plane of the discharge inducing section where the hollow structure is formed contains glass component, and the glass component is contained with a ratio of 20 vol % or more.

4. The ESD protection device of claim 1, wherein, the hollow space is formed so as to extend along a direction connecting the electrode.

5. The ESD protection device of claim 2, wherein, the plane of the discharge inducing section where the hollow structure is formed contains glass component, and the glass component is contained with a ratio of 20 vol % or more.

6. The ESD protection device of claim 2, wherein, the hollow space is formed so as to extend along a direction connecting the electrode.

7. The ESD protection device of claim 3, wherein, the hollow space is formed so as to extend along a direction connecting the electrode.

8. The ESD protection device of claim 5, wherein, the hollow space is formed so as to extend along a direction connecting the electrode.

* * * * *